United States Patent [19]
Antonov

[11] Patent Number: 5,884,046
[45] Date of Patent: Mar. 16, 1999

[54] APPARATUS AND METHOD FOR SHARING DATA AND ROUTING MESSAGES BETWEEN A PLURALITY OF WORKSTATIONS IN A LOCAL AREA NETWORK

[75] Inventor: Vadim Antonov, Belmont, Calif.

[73] Assignee: Pluris, Inc., Palo Alto, Calif.

[21] Appl. No.: 735,556

[22] Filed: Oct. 23, 1996

[51] Int. Cl.⁶ ............................ G06F 13/00; G06F 15/173
[52] U.S. Cl. .............................. 395/200.68; 395/200.32; 395/200.33; 395/200.49; 395/200.69; 395/200.81; 395/200.82
[58] Field of Search ........................... 395/200.3–200.33, 395/200.42, 200.46–200.49, 200.55–200.57, 200.67–200.69, 200.81–200.82, 200.35

[56] References Cited

U.S. PATENT DOCUMENTS

| | | | |
|---|---|---|---|
| 4,577,272 | 3/1986 | Ballew et al. | 395/182.13 |
| 4,942,517 | 7/1990 | Cok | 395/800.11 |
| 5,041,963 | 8/1991 | Ebersole et al. | 395/200.81 |
| 5,163,131 | 11/1992 | Row et al. | 395/200.32 |
| 5,243,704 | 9/1993 | Baty et al. | 395/280 |
| 5,247,689 | 9/1993 | Ewert | 395/311 |
| 5,287,453 | 2/1994 | Roberts | 395/200.82 |
| 5,355,453 | 10/1994 | Row et al. | 345/200.49 |
| 5,428,783 | 6/1995 | Lake | 395/676 |
| 5,440,713 | 8/1995 | Lin et al. | 711/158 |

(List continued on next page.)

FOREIGN PATENT DOCUMENTS 2 294 132A   4/1996   United Kingdom .

OTHER PUBLICATIONS

A. Luotonen, K. Altis, "World–wide Web proxies", *Computer Networks and ISDN Systems*, vol. 27, Nov. 1994, pp. 147–154, XP–002055636.

D. Neal, "The Harvest Object Cache in New Zealand", *Computer Networks and ISDN Systems*, vol. 28, May 1996, pp. 1415–1430, XP–002055643.

(List continued on next page.)

*Primary Examiner*—Parshotam S. Lall
*Assistant Examiner*—Bharat Barot
*Attorney, Agent, or Firm*—Pillsbury, Madison & Sutro, LLP

[57] ABSTRACT

A parallel local area network server is capable of sharing data and routing messages between workstations in a local area network. An apparatus according to the invention includes a plurality of processing nodes, each constituted by at least a single data processor, and an interconnect by which the processing nodes communicate. A plurality of mass storage devices are associated with the processing nodes, and a plurality of workstation computers are connected to the processing nodes. Each processing node includes is adapted to route messages to workstation computers associated with other processing nodes and to access data located both locally and at data storage devices associated with other processing nodes. A method according to the invention includes receiving a message at a first processing node and determining if the message is directed to a workstation computer at a second processing node and sending the message to the second processing node for subsequent delivery to the workstation computer. If the message includes a request for a specific data, a second determination is made if the specific data is in the local cache memory of the first processing node. If the specific data is not in the local cache memory, determination is made if the specific data is in a mass storage device at the first processing node, and if so the mass storage device is accessed to obtain the specific data. If the specific data is not in the local mass storage device, a message is forwarded to a remote processing node to request the specific data. Once this data is obtained, it is sent to the requesting workstation computer. The network server system according to the invention thus provides the functions of a file server and a local area network switch, thereby eliminating performance limitations associated with overloaded connections between file servers and LAN switches in conventional local area networks.

23 Claims, 7 Drawing Sheets

U.S. PATENT DOCUMENTS

| | | | |
|---|---|---|---|
| 5,442,771 | 8/1995 | Filepp et al. | 395/200.49 |
| 5,475,856 | 12/1995 | Kogge | 395/800.2 |
| 5,485,627 | 1/1996 | Hillis | 395/800.13 |
| 5,490,270 | 2/1996 | Devarakonda et al. | 395/200.56 |
| 5,548,724 | 8/1996 | Akizawa et al. | 395/200.33 |
| 5,613,067 | 3/1997 | Brady et al. | 395/200.55 |
| 5,673,381 | 9/1997 | Huai et al. | 395/180 |

OTHER PUBLICATIONS

K. Kamiya, M. Roscheisen, T. Winograd, "Grassroots: A system providing a uniform framework for communicating, structuring, sharing information, and organizing people", *Computer Networks and ISDN Systems*, vol. 28, May 1996, pp. 1157–1174, XP–002055638.

H.F. Nielsen, H.W. Lie, "Towards a uniform library of common code; A presentation of the CERN Worldwide–web Library", *Computer Networks and ISDN Systems*, vol. 28, Dec. 1995, pp. 13–23, XP–002055639.

I. Deloose, A. Pace, "The ISOLDE control System," *Nuclear Instruments and Methods in Physics Research*, 15 Dec. 1994, pp. 471–475, XP002055640.

A.S. Tanenbaum, "ComputerNetworks,"1993, Prentice–Hall International Editions, Englewood Cliffs, US, pp. 3, 455, 542, 555 XP–02055641.

Jacob Palme, "Electronic Mail" 1995, Artech House, Boston, US, pp. 98, 127, XP–00205564, 212240.

APPARATUS AND METHOD FOR SHARING DATA AND ROUTING MESSAGES BETWEEN A PLURALITY OF WORKSTATIONS IN A LOCAL AREA NETWORK

TECHNICAL FIELD

This invention relates to a system for providing access to shared data files and for routing messages between workstation computers.

BACKGROUND OF THE INVENTION

Practically all existing office computer systems, such as that depicted in FIG. 1, comprise a number of workstation computers 13 connected to some local area network (LAN) 11. One or more dedicated computers act as a file server 10. These file servers provide access to attached storage devices, such as disk drives 14, which contain the shared data files. These data files are retrieved or updated by the file server in accordance with requests transmitted by workstation computers over the local area network. The local area network also carries communications between workstation computers.

The local area network 11 is essentially a shared data transmission medium. As such, the capacity of the medium is shared between the workstation computers 13 attached to it. In order to effect higher performance of the local area network, LAN switches 12 are used. These are also known as filtering bridges. In this type of arrangement the local area network is split into several independent segments 11A and 11B which are interconnected with a LAN switch. The LAN switch is programmed with, or automatically discovers, data regarding the connection arrangement of workstation computers and corresponding segments. Because of this data, LAN switch is able to route traffic only to relevant segments of the LAN, thus eliminating unnecessary traffic on other segments of the local area network. For large local area networks, a substantial number of segments can be created to be interconnected by multiple LAN switches.

Algorithms and systems for remote access to shared files are well known in the conventional technology. Such systems and techniques are described in numerous publications, such as *Managing NFS and NIS* by Hal Stem, published by O'Reilly & Associates, Inc., Jun. 1991).

Conventional arrangements allow aggregate LAN capabilities in excess of the normal capacity of the LAN physical medium. While this approach achieves aggregate LAN capacities far in excess of that of LAN physical media, the capacity of the segment 11B between the file server 10 and the LAN switch 12 remains limited. When a substantial number of workstation computers 13 request access to shared data files, via their respective segments 11A and LAN switch 12, the segment 11B can quickly become overloaded.

To avoid the problem of overload in segment 11B several approaches have been used in conventional systems. The first approach is to make use of high-speed interconnection technologies, such as the 100-Mbps Ethernet. However, this approach is severely limited by the difficulty inherent to processing and transmitting radio-frequency signals. These difficulties severely limit the maximum usable capacity of the file server. Use of the single high-speed data path renders the overall system very fragile since any failure in the high-speed data path is likely to disable large parts of the entire local area network.

A second approach is described in U.S. Pat. No. 5,548,724 to Akizawa et al. (1994). The system disclosed therein includes a plurality of file servers running very complicated and elaborate load-balancing software. The complexity of required software (as well as its high cost) and the difficulty of administration of numerous separate file servers render this approach impractical. Further, such systems also require extensive modification of software running on workstation computers to support switching to alternative file servers in case of a failure in a particular file server or in a portion of the system linking the workstation computers to file servers. All of these considerations render this approach far too expensive for most applications.

In a third approach a packet router is used instead of the LAN switch 12, so as to separate the logical network into a plurality of different sub-networks. A file server is attached to more than one sub-network, so the traffic from different sub-networks will reach the file server through different physical links. This approach does not scale (upwards in performance) well and requires use of an expensive router. This system also requires administrative changes in configurations of workstation computers (to be performed by skilled personnel) every time a workstation computer is moved from one sub-network to another. Local area networks built using this approach are vulnerable to failures in both the packet router and the file server.

A number of examples of additional approaches to improvement of performance of local area networks are found in the following documents: U.S. Pat. No. 5,485,627 to Hillis (1996); U.S. Pat. No. 5,243,704 to Baty et. al. (1993); U.S. Pat. No. 5,475,856 to Kogge (1995); U.S. Pat. No. 4,942,517 to Cok (1990); U.S. Pat. No. 5,355,453 to Row et. al. (1994); U.S. Pat. No. 5,163,131 to Row et al. (1992); and U.S. Pat. No. 4,577,272 to ballew et. al. (1996). All of these references disclose methods for improving the performance of file servers by using multiple processing units working in parallel. However, each system fails to address the issue of the capacity of the link between the file server and the LAN switch. These examples also fail to improve reliability of the whole LAN since they are primarily directed only to the reliability of single components within the local area network.

SUMMARY OF THE INVENTION

Accordingly, one object of the present invention is to eliminate the overload on network links between file servers and the rest of the network.

Additional objects of the present invention are:

to reduce competition among the workstation computers for access to shared data files;

to provide a combined system for routing messages between workstation computers as well as requests for access to shared data files;

to reduce system administration costs by reducing the number of devices in a LAN that must be configured and serviced;

to increase the availability of centrally stored programs and data files to large numbers of workstation computers;

to reduce the access time necessary to obtain data from a shared file system by a workstation computer;

to provide a shared data file system that can be easily reconfigured to accommodate increased numbers of computer workstations and shared data sets.

These and other objects and advantages of the present invention are achieved by a system arranged for routing messages between workstation computers and providing access for workstation computers to shared data files. The system includes a plurality of processing nodes, each constituted by at least a single data processor, and means for interconnecting the processing nodes. A plurality of mass storage devices are associated with the processing nodes, and a plurality of workstation computers are connected to the processing nodes. Each processing node includes means for routing messages to workstation computers associated with other processing nodes and a means for accessing data located both locally and at data storage devices associated with other processing nodes.

In a second embodiment the present invention is effected by a method for routing messages. Such messages include requests to access specific data in a shared file system serving a plurality of workstation computers connected to a plurality of processing nodes having means for interconnecting the processing nodes and a plurality of mass storage devices respectively associated with the processing nodes. Included are the steps of receiving a message at a first processing node and determining if the message is directed to a workstation computer at a second processing node and sending the message to the second processing node for subsequent delivery to the workstation computer. In the next step a determination is made if the message includes a request for a specific data, and the second determination is made if the specific data is in the local cache memory of the first processing node. If the specific data is not in the local cache memory, determination is made if the specific data is in a mass storage device at the first processing node, and if so the mass storage device is accessed to obtain the specific data. If the specific data is not in the local mass storage device, a message is forwarded to a remote processing node to request the specific data. Once this data is obtained, it is sent to the requesting workstation computer.

DRAWINGS

DETAILED DESCRIPTION OF THE PREFERRED EMBODIMENT

Figure 1:
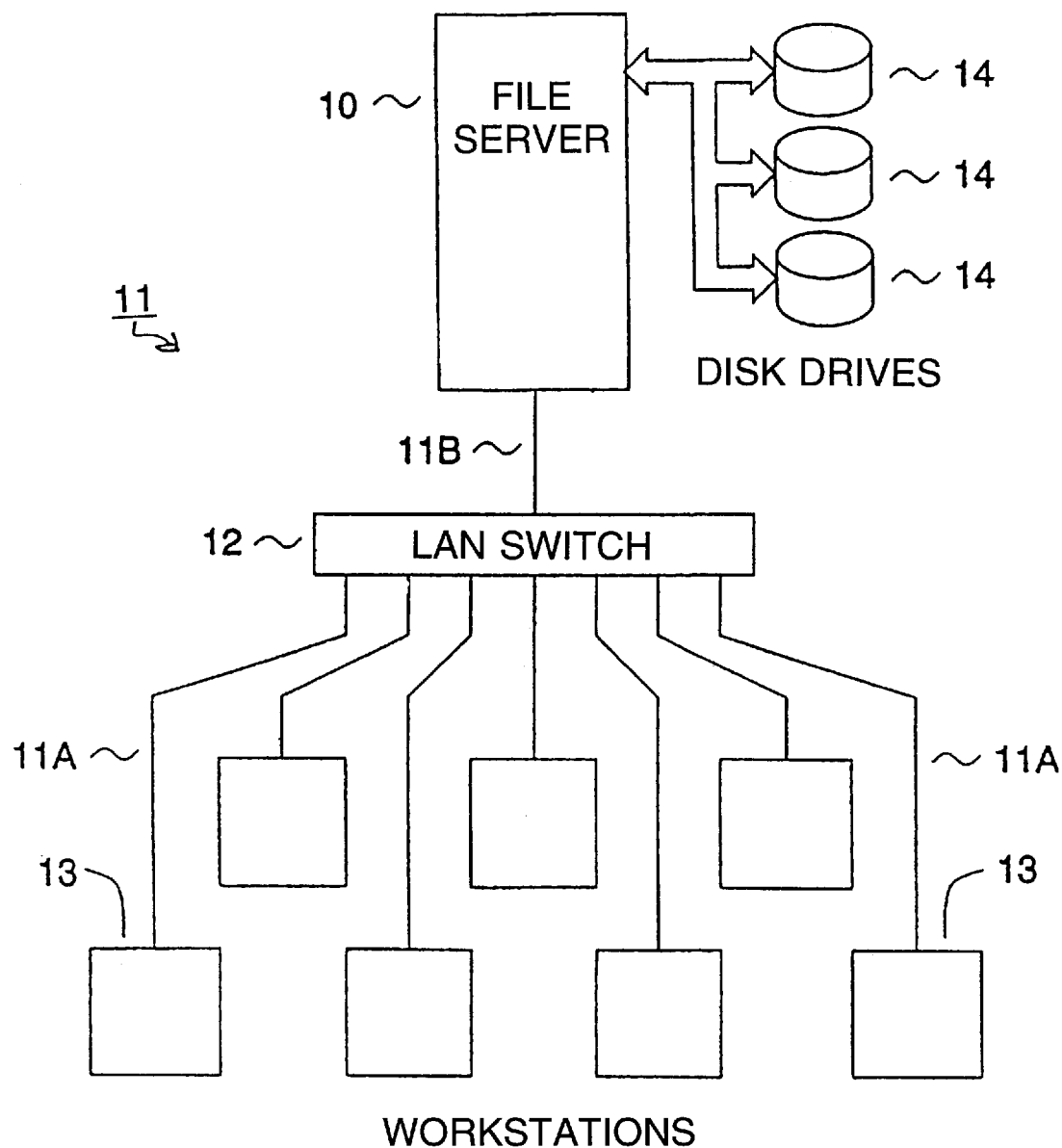
FIG. 1 is a block diagram depicting a conventional local area network having a single file server, a single LAN switch and a plurality of workstation computers.
Figure 2:
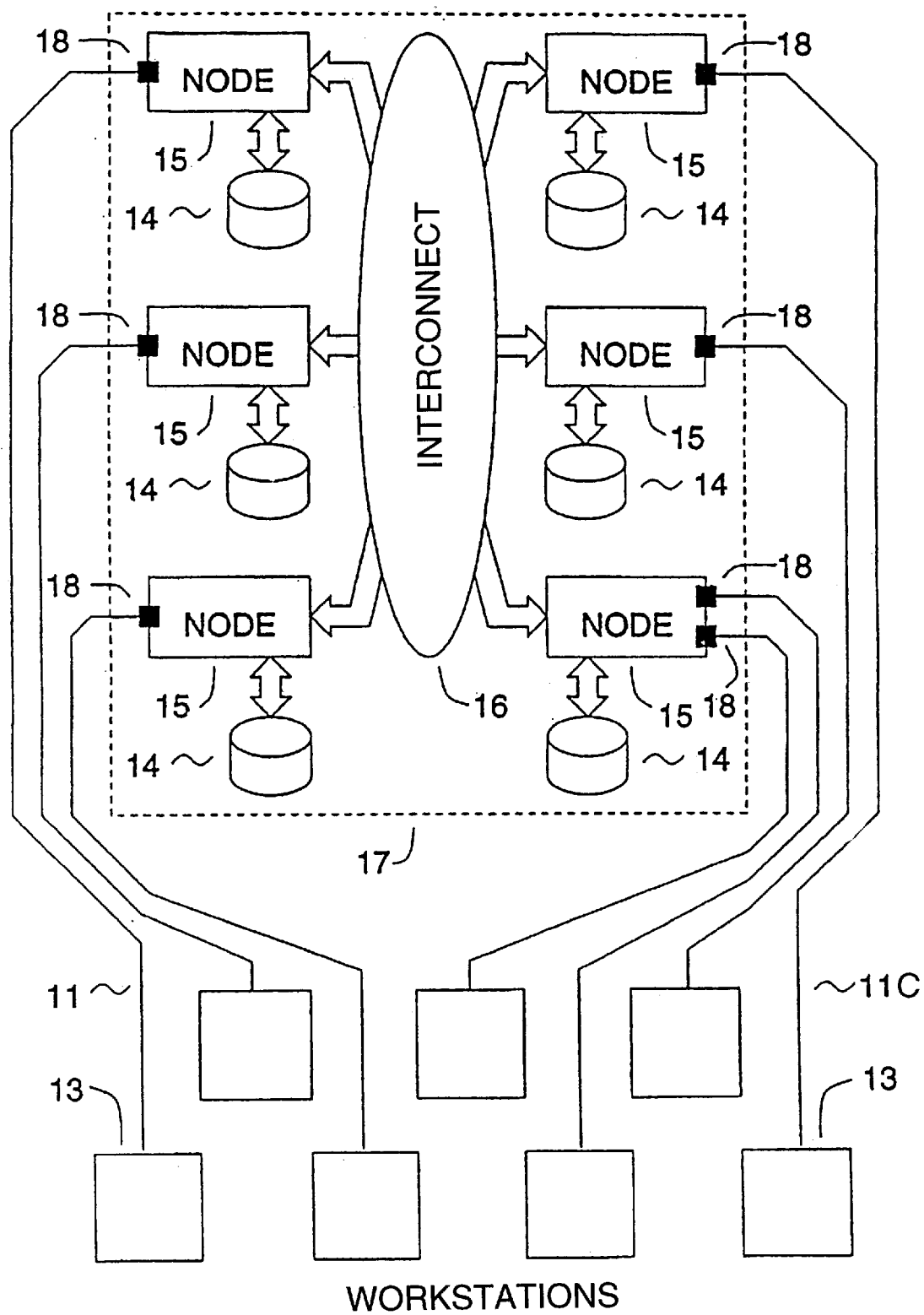
FIG. 2 is a block diagram depicting a local area network built around the parallel local area network server of the present invention.

A preferred embodiment of a local area network utilizing a parallel local area network server is depicted in FIG. 2. This embodiment is implemented using a multiple instruction multiple data (MIMD) massively-parallel computer 17. The present invention also resides in the operation of this computer as depicted in the functional flow diagrams of FIGS. 3 and 4.

The massively parallel-computer 17 is composed of a plurality of processing nodes 15, each equipped with at least one central processor, random access memory and an interface to mass data storage device 14. Mass data storage devices 14 can be constituted by hard disk drives, CD-ROMs, etc. Also included in this embodiment are interfaces 18 to local area network links 11C. The nodes are connected together using a high-speed data interconnect arrangement 16. The processing nodes operate independently from each other, communicating only over the high-speed data interconnect arrangement. Each processing node is constituted by a general purpose or specialized data processing machine. Such data processing machines are well-known in the conventional art, and need no further elaboration for purposes of understanding the present invention.

In the preferred embodiment of the present invention, the high-speed data interconnect 16 is constituted by a linearly scalable architecture. A linearly scalable data interconnect architecture has aggregate throughput proportional to the number of attached processing nodes 15. Examples of such an architecture are hypercube, fat tree, butterfly switch, etc. Because of this arrangement, a large number of processing nodes can be interconnected without significant deterioration of the performance of any single processing node. Further, interconnect technologies providing a distributed shared memory functionality (such as SCI) can be employed in the present invention. However, simpler message-passing interconnects are also sufficient for use with the present invention. Thus, the present invention is not limited to any specific type of interconnect technology.

Figure 6A:
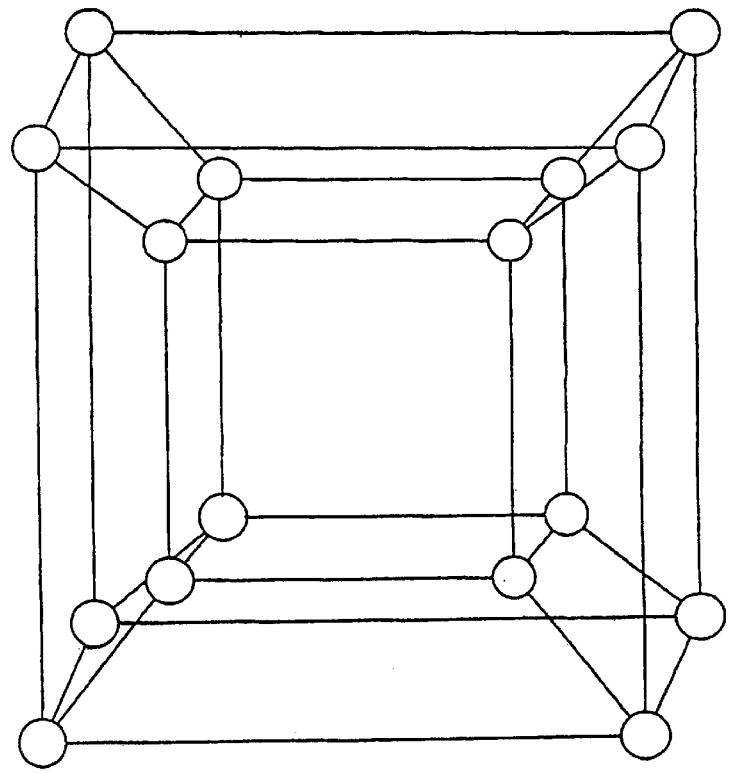
FIG. 6 is a schematic diagram depicting the topology of a hypercube data interconnection.
FIG. 6B is a schematic diagram depicting the topology of a fat tree data interconnection.
FIG. 6C is a schematic diagram depicting the topology of a butterfly switch data interconnection.
Figure 6B:
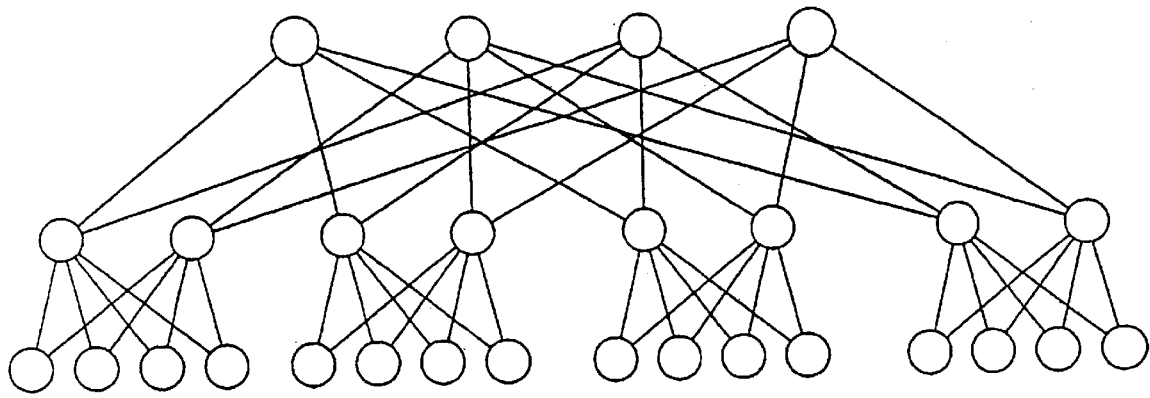
Figure 6C:
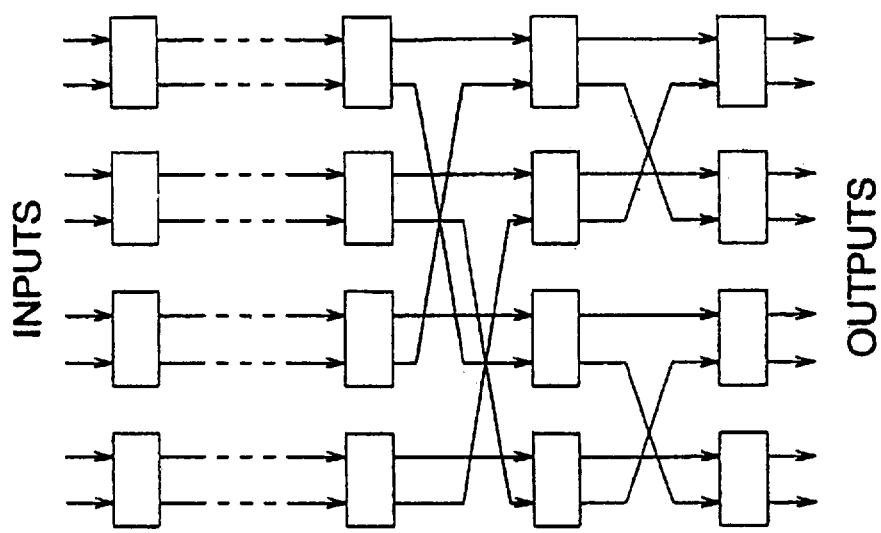

Among the preferred data interconnect systems are those depicted in FIGS. 6A, 6B and 6C. All can be used as the FIG. 2 data interconnect arrangement 16. All are linearly scalable since aggregate capacity of each is proportional to the number of processing nodes 15 attached to it. The FIG. 6A embodiment is a hypercube. A second data interconnect arrangement is a fat tree depicted in FIG. 6B. A third arrangement, as depicted in FIG. 6C, is a butterfly switch. The properties of these data interconnect arrangements and detailed discussion of their operation can be found in *Introduction To Parallel Algorithms And Architectures: Arrays, Trees, Hypercubes* by F. Thomson Leighton, published by Morgan Kaufmann Publishers, 1992.

There are numerous modifications, variations, and improvements of the three aforementioned basic scalable interconnect technologies. Such modifications can be used to improve performance and fault tolerance of the system of the present invention. All the various modifications in this technology are well-known so that further elaboration is not necessary for an understanding of the present invention. Also, while the preferred embodiment of the present invention uses linearly scalable data interconnect arrangements, the present invention is not limited thereto. Rather, this invention can be carried out using a massively-parallel computer with non-linearly scalable data interconnect arrangements., such as cross-bar, shared bus, etc.

In FIG. 2, the mass data storage devices 14 are separated into groups which are connected to corresponding processing nodes 15. As a result, the data transfer between a node and a corresponding mass storage device associated with that node does not interfere with data transfers between other processing nodes and their associated mass storage devices. While the preferred configuration of the present invention includes an arrangement of mass storage devices evenly distributed between the processing nodes, this is not necessary to the operation of the present invention. Rather, some of the processing nodes may have no mass storage devices associated with them.

Workstation computers 13 are connected to processing nodes 15 via network links 11C, also known as segments. Several such segments may be connected to a processing node. Also, several workstation computers may share the same segment or link. In the preferred embodiment of the present invention, the local area network is arranged so that the workstation computers are attached to processing nodes in such a way that the traffic generated by the workstation computers is distributed evenly among the processing nodes. When several workstation computers share a single network segment, a fan-out device such as a LAN hub can be inserted between the workstation computers 13 and the massively parallel computer 17. Although the use of a conventional LAN switch in place of the LAN hub is possible, such use is not likely to produce the benefits usually associated with LAN switches. This is true because most of the data traffic will traverse the segment directly attached to the massively parallel computer, thus limiting aggregate capacity of all sub-segments attached to the LAN switch. Therefore no significant performance gain can be obtained by use of a LAN switch instead of a LAN hub.

Figure 5:
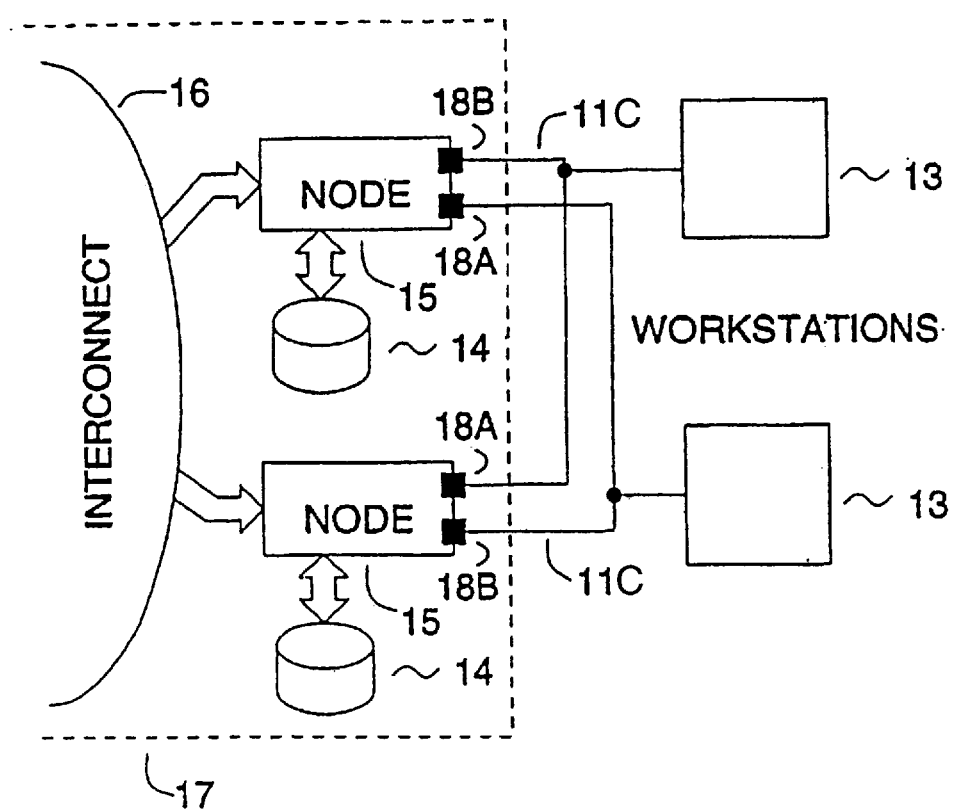
FIG. 5 is a block diagram depicting an alternative connection arrangement between processing nodes and workstation computers.

Additional improvements can be achieved using the arrangement depicted in FIG. 5. As illustrated, workstation computers 13 are operatively connected to more than one processing node 15 using multi-point local area network links 11C connected to primary and secondary LAN interfaces 18A, 18B. Under normal circumstances, a workstation computer communicates with only one processing node via primary interface 18A. If the primary interface 18A or corresponding processing node or attachment of the network segment to the primary interface fails the secondary interface 18B becomes active. This allows the communication with the functional part of the massively parallel computer 17 to be restored. To avoid the complications of informing attached workstation computers about the failure of an individual processing node or corresponding attachment, a secondary LAN interface 18B can be programmed to respond to the same Media Access Control (MAC) address as the primary interface 18A (this technique is used in Cisco Systems' Host Stand-By Protocol).

Figure 3:
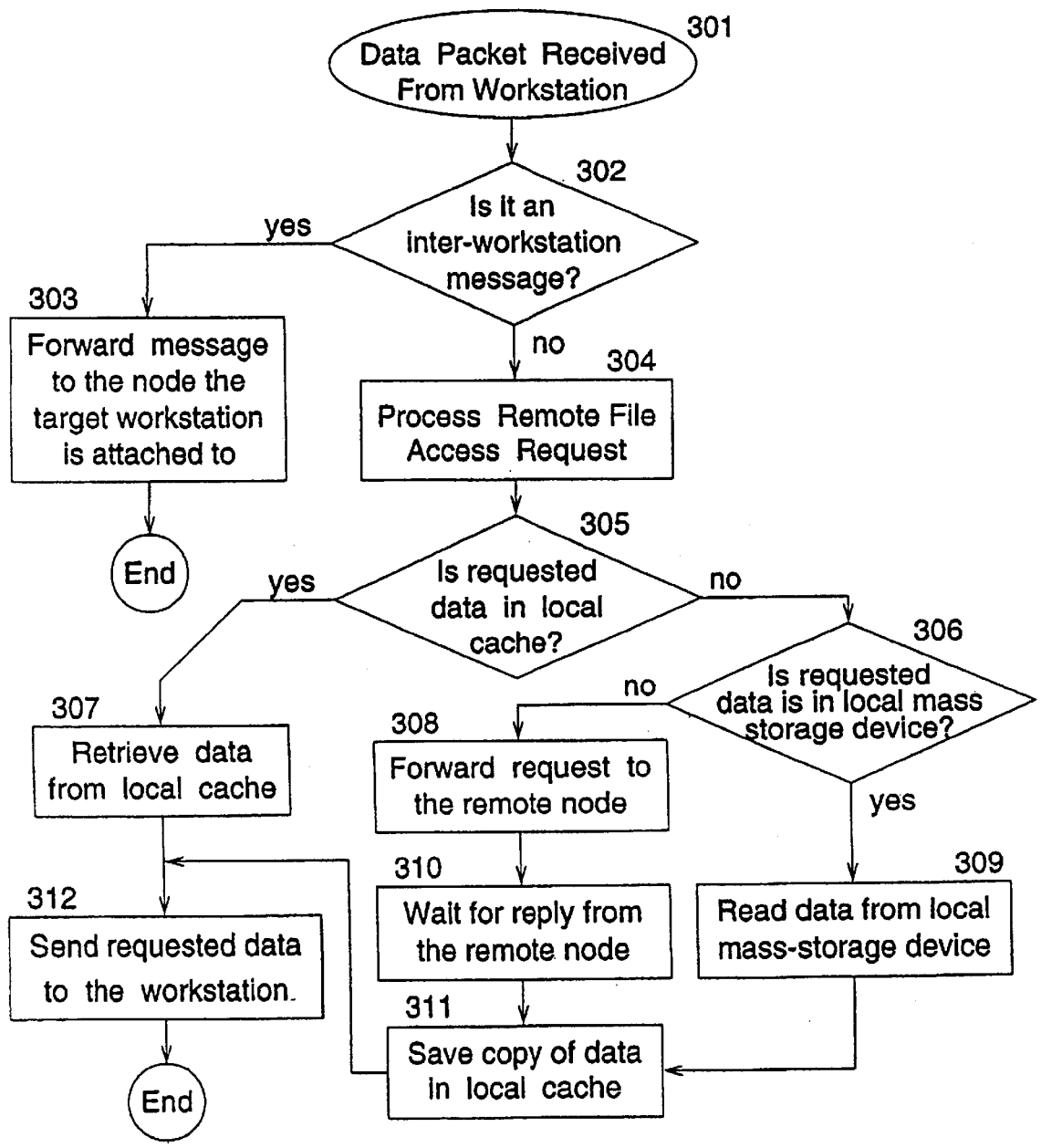
FIG. 3 is a flow-chart depicting the operation of a processing node upon receipt of a message from a workstation computer.

FIG. 3 depicts the routing process which occurs at a processing node 15 when a message (data packet) is received from a workstation computer 13 by way of a local area network 11. A workstation computer generates a data packet identifying another workstation computer to which the first workstation computer intends to send the message, or indicating a request for access to particular data contained within the distributed file server storage devices.

At step 301 in FIG. 3, the subject data packet is received at a particular processing node 15. An identification process (step 302) is carried out to determine if the subject data packet: contains an inter-workstation message. If this is the case, the recipient workstation computer is identified along with a processing node associated with the workstation computer. Once this has been done, the message is forwarded to the processing node associated with the recipient workstation computer by means of the data interconnect arrangement 16 as indicated at step 303. Then the message is routed to the recipient workstation computer, as described hereinafter in discussion of FIG. 4. Since the message to the recipient workstation computer does not require any response from any processing node, the process ends at this point. The same process occurs if the recipient workstation computer is associated with the same node receiving the data packet. In this case, the recipient workstation is being identified as being associated with or connected to the receiving processing node, and the message is sent directly to the recipient workstation without transmission to a foreign processing node.

In order to direct a message to a workstation computer associated with a foreign node, it is necessary that each processing node maintain a database describing a correspondence between the various workstations and associated processing nodes. Such a database can be statically configured or dynamically acquired by monitoring source addresses of data packets found in traffic on the local area network links, or by means of a special address discovery protocol, such as Address Resolution Protocol (ARP).

If the data packet received from the workstation computer contains a request for retrieval of particular data from a shared file maintained by the file server system, the request is processed at the receiving processing node as indicated at step 304. A sequential process is carried out to locate and retrieve the specific data being requested. At step 305 a determination is made regarding the location of the requested data in a local cache memory. If the requested data is in the local cache memory, it is immediately retrieved as indicated at step 307, and sent to the requesting computer workstation as indicated in step 312. The request being satisfied, the process ends at this point.

If, on the other hand, the requested data is not in the local cache memory, a determination is made regarding the location of the requested data in a locally attached mass storage device, as indicated in step 306. If the requested data is found there, it is read from the mass storage device at step 309. A copy of that data is also saved in a local cache memory as indicated at step 311, and the requested data is sent to the requesting workstation computer as indicated at step 312. At this point, the requested data has been received by the requesting workstation computer and the process ends.

If the requested data is not in the local cache memory, and is not stored in the local mass storage device, the request for the particular data is forwarded to a remote processing node by means of the interconnect apparatus 16. The processing node which forwarded the request then waits for a reply from the remote processing node to which the request was sent, as indicated at step 310. When a reply with the requested data is received, the requested data is saved in the local cache memory of the receiving processing node (step 311), and the data is sent to the requesting workstation as indicated at step 312.

Data storage requests are handled similarly. The difference is that instead of returning the requested data, the remote processing node is expected to return only a confirmation of data storage. The local processing node (which received the original request) sends to the requesting workstation computer only a confirmation that the data storage request was completed. When storing data upon a request, special care must be taken to invalidate all copies of changed data stored in the various cache memories at all of the processing nodes of the massively-parallel computer 17. This situation creates a need for a number of additional techniques.

To guarantee that all copies of data blocks contained in the various cache memories of different processing nodes are identical, there are six basic techniques (and a large variety of combinations of these techniques) that can be used. The first technique is broadcast invalidation in which every data update request causes broadcasting of a message containing the request for invalidation of a specific data block to all processing nodes over the data interconnect apparatus. As a result, every processing node will receive a copy of the invalidation request, and will remove the obsolete copy of the subject data block from its cache memory, if necessary.

A second technique involves the use of explicit invalidation lists. Using this technique, every data retrieval request forwarded to a remote processing node causes that remote processing node to add the identifier of the local processing node to the list of holders of copies of a particular data block. When an update request is received by the remote processing node, that processing node sends out an invalidation request to every other processing node on the explicit invalidation list associated with that particular data block. Then the invalidation list is cleared.

The third technique involves explicit invalidation lists with timeouts. This is similar to use of explicit invalidation lists. However, entries in the invalidation list expire and are removed after a predetermined amount of time. Processing nodes holding copies of the particular data in their local cache memories periodically send out renewal messages to prevent their invalidation list entries from expiration.

The fourth technique involves the use of explicit invalidation lists with removals. This is similar to the use of simple explicit invalidation lists but augmented with an explicit removal mechanism. When a processing node removes a data block from its cache memory, it sends a removal notification message to the remote processing node which has the original copy of that data block. As a result, the requesting node will be removed from the remote processing nodes explicit invalidation list.

The fifth technique involves distributed invalidation lists. This technique utilizes distributed data structures, such as lists or trees distributed over multiple processing nodes. As a result, a datum of those data structures correspond to a copy of a data block. The datum is removed from the data structure when a processing node removes a copy of the data block from its cache memory. The invalidation process is initiated by the processing node which has the original copy of that particular data block its mass storage device. The overall invalidation process is performed by traversing the distributed data structure. Alternatively, the secondary copies of data blocks may be updated instead of being invalidated. In this case, update requests containing new data may be sent to the processing node's secondary copies instead of invalidation requests, using the same techniques for locating processing nodes which hold secondary copies of the particular data block.

The sixth technique involves explicit prohibition of making secondary copies of data blocks belonging to a data file which was opened for updating by a workstation computer. This is achieved by attaching an explicit "do not copy" notice to every message containing such data block by the processing node which has the original copy of that data block its mass storage device. The presence of that notice causes the requesting processing nodes to bypass step 311 (in FIG. 3); and so no secondary copies of data from such files will be created.

Figure 4:
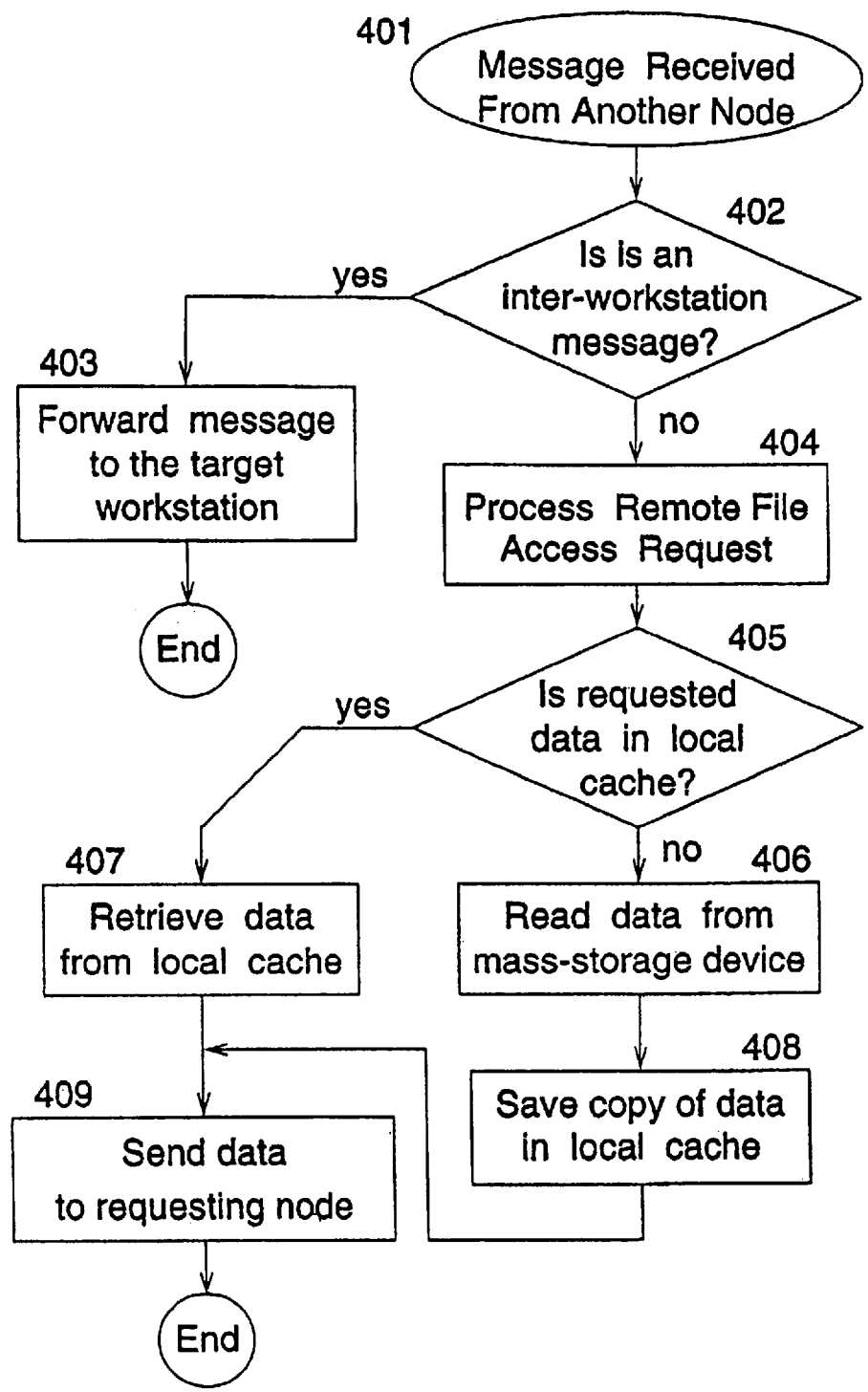
FIG. 4 is a flow-chart depicting the operation of a processing node upon receipt of a message from another processing node.

The flow diagram of FIG. 4 depicts a sequence of the process carried out when a processing node receives a message from another processing node by means of the high-speed interconnect apparatus 16 (in FIG. 2). In many respects the process is similar to that depicted in FIG. 3. At step 401 a message is received at one processing node from another processing node. A determination is made if the message is an inter-workstation message, as indicated at step 402. If this is true, the message is forwarded to the target computer workstation as indicated at step 403. At this point, the object of the process has been carried out and the process ends.

If, on the other hand, the received message contains a request for retrieval or updating of data stored in a shared data file, the request is processed by the receiving processing node as indicated at step 404. During this process, data identification and other information necessary to satisfy the request are extracted from the message.

If the message contains a request for particular data, a predetermined sequence is carried out. First, at step 405, a search of the local cache memory is made to access the requested data. If the requested data is contained therein, it is retrieved at step 407. The requested data is then sent to the requesting processing node (step 409). At this point the request has been satisfied and the process ends.

If the requested data is not found in the local cache memory, it is assumed to be stored in a mass storage device associated with the processing node which received the request message. An attempt is made to retrieve the requested data from the mass storage device (step 406). Upon retrieving the requested data, a copy of that data is saved in the local cache memory as indicated at step 408. Then the requested data is sent to the requesting node (step 409). At this point the request has been satisfied and the process is complete.

In order to perform the aforementioned operations successfully and efficiently, it is necessary that the requested data be associated with the mass data storage devices that would normally contain it, and that the mass data storage devices be associated with processing nodes. Thus, it is necessary to maintain a data set which allows mapping of data file identifiers to the mass storage devices and corresponding processing nodes. The techniques for such mapping are well known in the conventional art, and are implemented by a number of vendors in commercially-available products. Because of this mapping it is expected that if the requested data is not in a local cache memory of a processing node which has received a request, then it will be in the mass data storage device or cache memory of the processing node to which the request was forwarded.

To improve the availability of certain data, multiple copies of important files can be kept in mass storage devices associated with a plurality of different processing nodes. If this is done, a failure of a single mass data storage device or processing node will not cause temporary inaccessibility or permanent loss of the subject data.

An alternative method for achieving better data redundancy is the use of a technique known as Reliable Array of Inexpensive Disks (RAID-5). When this is done, corresponding data and parity stripes can be located in mass storage devices attached to different processing nodes. As a result, a failure of a particular processing node or mass data storage device will not cause permanent loss of data or interruption of service.

Although the aforementioned description contains specifics, these should not be construed as limiting the scope of the invention. Rather, these are merely illustrations of some of the presently preferred embodiments of the present invention. For example, any functional equivalent (for the purposes of the present invention) of the massively parallel computer can be used rather than the general purpose massively-parallel computer of the preferred embodiment.

Accordingly, the invention should be considered to include any and all configurations, modifications, variations, combinations, equivalent arrangements or expansions falling within the scope of the following claims.

I claim:

1. An apparatus for sharing data and routing messages between workstations in a local area network, comprising:

at least first and second mass data storage devices adapted to store shared data;

an interconnect; and at least first and second processing nodes respectively associated with said first and second mass data storage devices and adapted to communicate with each other via said interconnect, said first and second processing nodes further adapted to respectively communicate with first and second workstations via first and second links that are independent of said interconnect and each other, wherein when said first workstation requests said shared data and said shared data is not present in said first processing node, said first processing node is adapted to request said shared data from said second processing node via said interconnect, and said second processing node is adapted to supply said shared data via said interconnect, and wherein said first processing node is further adapted to forward a message addressed to said second workstation from said first workstation to said second processing node via said interconnect.

2. An apparatus as defined in claim 1, wherein the total shared data of said local area network is divided between at least first and second data sets, said first data set being different than said second data set, said first and second mass storage devices respectively storing said first and second data sets.

3. An apparatus as defined in claim 2, wherein said first and second data sets are substantially the same size.

4. An apparatus as defined in claim 1, wherein said interconnect has an aggregate capacity proportional to the number of said processing nodes.

5. An apparatus as defined in claim 4, wherein said interconnect is one of a hypercube, a fat tree, and a butterfly switch.

6. An apparatus as defined in claim 1, wherein said first processing node is further adapted to communicate with a third workstation via a third link independent of said first and second links and said interconnect and to forward a second message addressed to said third workstation from said first workstation to said third workstation via said third link.

7. An apparatus as defined in claim 1, wherein said first and second processing nodes are adapted to communicate with each other via said interconnect at a first speed, and are adapted to respectively communicate with said first and second workstations at speeds lower than said first speed.

8. An apparatus as defined in claim 1, wherein said first processing node is further adapted to communicate with said second workstation via a secondary link independent of said first and second links and said interconnect when said second link and/or said second processing node is inoperative.

9. An apparatus as defined in claim 1, wherein said first processing node includes a database describing a correspondence between said processing nodes and said workstations, said first processing node adapted to forward said message addressed to said second workstation in accordance with said database.

10. An apparatus for sharing data and routing messages between workstations in a local area network, comprising:

at least first and second mass data storage devices adapted to store shared data;

an interconnect; and at least first and second processing nodes respectively associated with said first and second mass data storage devices and adapted to communicate with each other via said interconnect, said first and second processing nodes further adapted to respectively communicate with first and second workstations via first and second links that are independent of said interconnect and each other, wherein when said first workstation requests said shared data and said shared data is not present in said first processing node, said first processing node is adapted to request said shared data from said second processing node via said interconnect, and said second processing node is adapted to supply said shared data via said interconnect, and wherein said first processing node is further adapted to forward a message addressed to said second workstation from said first workstation to said second processing node via said interconnect, and wherein said first and second processing nodes include first and second cache memories, said first processing node storing a copy of said shared data in said first cache memory when said second processing node supplies said shared data.

11. An apparatus as defined in claim 10, wherein said first processing node checks said first cache memory and said first mass storage device before retrieving said shared data from said second processing node.

12. An apparatus as defined in claim 10, wherein said second processing node retrieves said shared data from said second mass storage device and stores a copy of said shared data in said second cache memory when said first processing node requests said shared data and said shared data is not present in said second cache memory.

13. An apparatus as defined in claim 2, wherein said first processing node supplies said shared data to said first workstation directly when said shared data is present in said first mass storage device or said first cache memory.

14. An apparatus for sharing data and routing messages between workstations in a local area network, comprising:

at least first and second mass data storage devices adapted to store shared data;

an interconnect; and at least first and second processing nodes respectively associated with said first and second mass data storage devices and adapted to communicate with each other via said interconnect, said first and second processing nodes further adapted to respectively communicate with first and second workstations via first and second links that are independent of said interconnect and each other, wherein when said first workstation requests said shared data and said shared data is not present in said first processing node, said first processing node is adapted to request said shared data from said second processing node via said interconnect, and said second processing node is adapted to supply said shared data via said interconnect, and wherein said first processing node is further adapted to forward a message addressed to said second workstation from said first workstation to said second processing node via said interconnect, and wherein the total shared data of said local area network is divided between at least first and second data sets, said first data set being different than said second data set, said first and second mass storage devices respectively storing said first and second data sets, and wherein said first and second processing nodes include first and second cache memories, said first processing node storing a copy of said shared data in said first cache memory when said second processing node supplies said shared data.

15. A method for sharing data and routing messages between workstations in a local area network, comprising:

receiving a message at a first processing node from a first workstation that communicates with said first processing node via a first link;

determining if said message is addressed to a second workstation that communicates with a second processing node via a second link different than said first link and forwarding said message to said second processing node via an interconnect different than said first and second links if so addressed;

determining if said message includes a request for shared data, and if so, determining if said shared data is present in said first processing node and retrieving said shared data if said shared data is present;

retrieving said shared data from said second processing node via said interconnect if said message includes a request for shared data and said shared data is not present in said first processing node; and sending said shared data to said first workstation via said first link.

16. A method as defined in claim 1, further comprising:

dividing the total shared data of said local area network between at least first and second data sets, said first data set being different than said second data set;

respectively storing said first and second data sets first and second mass storage devices; and respectively associating said first and second mass storage devices with said first and second processing nodes.

17. A method as defined in claim 15, further comprising:

determining if said message is addressed to a third workstation that communicates with said first processing node via a third link different than said first and second links and said interconnect and sending said message to said third workstation via said third link if so addressed.

18. A method for sharing data and routing messages between workstations in a local area network, comprising:

receiving a message at a first processing node from a first workstation associated with said first processing node;

determining if said message is addressed to a second workstation associated with a second processing node and forwarding said message to said second processing node if so addressed;

determining if said message includes a request for shared data, and if so, determining if said shared data is present in said first processing node and retrieving said shared data if said shared data is present;

retrieving said shared data from said second processing node if said message includes a request for shared data and said shared data is not present in said first processing node;

sending said shared data to said first workstation; and storing a local copy of said shared data in said first processing node after said step of retrieving said shared data from said second processing node.

19. A method as defined in claim 18, further comprising:

determining if said message includes a request to update shared data, and if so, updating said shared data if said shared data belongs to said first processing node;

forwarding said update request to said second processing node if said shared data does not belong to said first processing node, said second processing node updating said shared data;

invalidating said local copy of said shared data in said first processing node if said shared data does not belong to said first processing node.

20. A method for sharing data between workstations in a local area network, said method comprising:

dividing shared data of said local area network into a first data set and a second data set different than said first data set;

respectively storing said first and second data sets in first and second mass storage devices;

respectively associating first and second processing nodes with said first and second mass storage devices;

respectively adapting said first and second processing nodes to communicate with first and second workstations via independent first and second links;

adapting said first and second processing nodes to communicate with each other via an interconnect independent of said first and second links; and adapting said first processing node to request certain of said shared data from said second processing node via said interconnect, and adapting said second processing node to supply said certain shared data via said interconnect, when said first workstation requests said certain shared data and said certain shared data is not present in said first processing node; and adapting said first processing node to forward a message addressed to said second workstation from said first workstation to said second processing node via said interconnect.

21. An apparatus for sharing shared data and routing messages between a plurality of workstations in a local area network, comprising:

a massively parallel computer comprising:

an interconnect; and a plurality of processing nodes, at least two of said processing nodes each including:

local data accessing means for accessing a local set of said shared data;

high speed means for interfacing with other of said processing nodes via said interconnect;

low speed means independent of said interconnect for interfacing with a respective one of said workstations;

local data supplying means, responsive to a local request for certain of said shared data from said respective workstation, for retrieving said certain shared data from said local set via said local data accessing means when said local set includes said certain shared data and for supplying said certain shared data to said respective workstation via said low speed means;

remote data requesting means, responsive to said local request for said certain shared data, for requesting said certain shared data from said other processing nodes via said high speed means when said local set does not include said certain shared data;

remote data supplying means, responsive to a remote request from another of said processing nodes, for forwarding said certain shared data via said high speed means when said local set includes said certain shared data; and messaging means, responsive to a message from said respective workstation addressed to another of said workstations, for forwarding said message to said other processing nodes via said high speed means.

22. An apparatus as defined in claim 2, further comprising:

a plurality of mass storage devices adapted to store shared data, wherein said local data accessing means includes means for interfacing with at least one of said mass storage devices, said local set of shared data including shared data stored in said at least one mass storage device.

23. An apparatus as defined in claim 21, wherein at least one other of said processing nodes includes:

high speed means for interfacing with other of said processing nodes via said interconnect;

low speed means for interfacing with a respective one of said workstations;

shared data requesting means, responsive to all requests for said shared data from said respective workstation, for requesting said certain shared data from said other processing nodes via said high speed means; and messaging means, responsive to a message from said respective workstation addressed to another of said workstations, for forwarding said message to said other processing nodes via said high speed means.

* * * * *